United States Patent
Van Horssen et al.

(10) Patent No.: US 6,854,209 B2
(45) Date of Patent: Feb. 15, 2005

(54) METHOD FOR GROWING PLANTS ACCOMMODATED IN CONTAINERS ON A BEARER PROVIDED AT A FIRST, LOW LEVEL IN A GLASSHOUSE

(75) Inventors: Frederik Pius Van Horssen, Brielle (NL); Harry Geerlings, Hoogezand (NL)

(73) Assignee: Rijnplant B.V., NC de Lier (NL)

( * ) Notice: Subject to any disclaimer, the term of this patent is extended or adjusted under 35 U.S.C. 154(b) by 0 days.

(21) Appl. No.: 10/283,152

(22) Filed: Oct. 30, 2002

(65) Prior Publication Data

US 2003/0097786 A1 May 29, 2003

(30) Foreign Application Priority Data

Oct. 30, 2001 (NL) .............................................. 1019257

(51) Int. Cl.[7] .................................................. A01G 9/14
(52) U.S. Cl. ................................................. 47/17; 47/18
(58) Field of Search ............................... 47/17, 18, 901

(56) References Cited

U.S. PATENT DOCUMENTS

| | | | | |
|---|---|---|---|---|
| 3,717,953 A | * | 2/1973 | Kuhn et al. ..................... | 47/1.1 |
| 3,913,758 A | * | 10/1975 | Faircloth et al. ............. | 414/373 |
| 4,075,949 A | | 2/1978 | Davis et al. | |
| 4,356,664 A | * | 11/1982 | Ruthner ......................... | 47/65 |
| 4,837,971 A | * | 6/1989 | Visser ............................ | 47/17 |
| 4,930,253 A | * | 6/1990 | Todd, Sr. ....................... | 47/65 |
| 4,947,579 A | * | 8/1990 | Harrison et al. ......... | 47/1.01 R |
| 5,247,761 A | * | 9/1993 | Miles et al. .............. | 47/1.01 R |
| 5,394,646 A | * | 3/1995 | Sumiyoshi et al. ............ | 47/17 |
| 5,881,655 A | * | 3/1999 | Edmonds et al. ............ | 111/105 |
| 5,943,818 A | * | 8/1999 | Fruehwirth .................... | 47/65 |

FOREIGN PATENT DOCUMENTS

| | | | | | |
|---|---|---|---|---|---|
| DE | 3534434 A | * | 4/1987 | ............ | A01G/9/14 |
| EP | 511715 A1 | * | 11/1992 | ............ | A01G/9/14 |
| FR | 1 521 065 | | 4/1968 | | |
| GB | 2 186 776 | | 8/1987 | | |
| GB | 2 341 833 | | 3/2000 | | |
| JP | 2000245266 A | * | 9/2000 | ............ | A01G/9/14 |
| NL | 1005626 | | 6/1998 | | |
| NL | 1006427 | | 12/1998 | | |
| WO | WO 92/03907 | * | 3/1992 | ............ | A01G/9/10 |

* cited by examiner

Primary Examiner—Son T. Nguyen
(74) Attorney, Agent, or Firm—Young & Thompson

(57) ABSTRACT

In a method for growing plants in a glasshouse and for moving said plants, and also propagation system, substantially the entire surface area of the glasshouse is used for propagating plants on a first, low bearer. Benches or second bearers are movable over the plants, and with a robot, plants can be moved from the first, low level to a second, higher level on the second bearer of the mobile benches. The mobile containers can be removed from the glasshouses in order to perform treatments on the plants.

13 Claims, 4 Drawing Sheets

METHOD FOR GROWING PLANTS ACCOMMODATED IN CONTAINERS ON A BEARER PROVIDED AT A FIRST, LOW LEVEL IN A GLASSHOUSE

BACKGROUND OF THE INVENTION

The present invention relates to a method for growing plants on a bearer provided at a first, low level in a glasshouse, wherein said plants are moved from said first bearer to a means of conveyance.

DESCRIPTION OF THE RELATED ART

Such a method is known from NL 1005626. For the wider spacing of pot plants grown, for example with a flood irrigation system, on the floor of a glasshouse, which floor acts as the bearer, use is made of forklift-type constructions wherein the distance between the plants is varied during transfer, so that account can be taken of the increased size of the plants.

In the case of another method of propagating plants the bearer for plants comprises so-called roller containers or benches. Such benches are provided with wheels, so that they can be moved. In the case of both methods part of the glasshouse is clear over its entire length and acts as an aisle for conveyors. In the case of the system with roller containers a vehicle moving in the aisle is used to take a roller container out of a group of containers and then transfer said container to a place of processing that can be situated outside the glasshouse. The same applies to the construction described above that works with a forklift-type vehicle.

In both cases the disadvantage is that the surface area of the glasshouse is not put to the optimum use, because the clear part of the glasshouse that is being used for conveyance purposes takes up a considerable part of the space. Moreover, human labour is required for the conveyance.

Dutch Patent No. 1005626 discloses a construction that is suspended from a tubular rail or the like, which construction can be operated by hand and on which construction plants can be placed. A construction with points is used. If fairly large quantities of plants are being moved, it is necessary to use a number of such conveyor devices.

Dutch Patent No. 1006427 discloses a conveyor system situated above plants and composed of two parallel belts between which a cut flower is accommodated. These cut flowers are placed on a belt situated at the end of a bay and are subsequently conveyed away. This means that a belt has to extend over the entire length of the glasshouse, and constant movement of the plant situated on it occurs.

French Patent No. 1521065 discloses the growing of plants at different levels. Trays with plants are moved during their life from a first, low level to an increasingly high level. Rollers along which the trays move are situated at each level. No bearers are used here.

SUMMARY OF THE INVENTION

It is the object of the present invention to provide a method by means of which it is possible to grow plants such as pot plants and be able to move them into a separate area for processing.

This object is realised with a method described above in that a number of second bearers disposed in a row are present and can be moved over said plants, movement of one of said second bearers causing movement of at least one other of said second bearers, and each second bearer being capable of containing a large number of plants placed next to each other in two directions.

By means of the invention it is possible to use substantially the entire width of the glasshouse for propagating plants, in particular plants in containers such as pots or trays. The conveyor device for plants, in other words the second bearer provided with a bearing surface, is moved over the plants. This second bearer may comprise a mobile bench, but may also move in another way relative to the glasshouse. This movement is only temporary, so that it is not a disadvantage that the particular plants underneath at the time go into the shade for a short period. A robot is used to feed plants onto the second bearer.

Unlike systems wherein the aisle in a glasshouse is used temporarily according to the last-in-first-out principle or first-in-first-out principle, it is possible with the present invention to remove plants from and/or place them in a glasshouse at any desired location, this being because the second bearer moves over the top of the plants being grown.

This robot is preferably designed so that it can move along the entire length of a particular glasshouse.

According to a special embodiment, the robot may comprise a conveyor system by means of which it is possible to alter the distance between the plants. In other words, the distance between the plants on the first bearer differs from the distance between the plants on the second bearer. This makes it possible, on the one hand, to feed in the plants in a position close up against each other and to place them in the glasshouse with greater spacing between them and, on the other hand, to produce greater spacing between them during the propagation.

According to the present invention, the second bearers, which are movable relative to the robot during the loading or unloading by the robot, preferably are taken into a fixed position relative to the robot. This can be achieved, for example, by clamping.

According to one embodiment, movement of the second bearers is achieved by interconnecting a series of second bearers. The last second bearer of a series is accommodated in and discharged from a receiving/delivery station respectively. In this delivery station the second bearers are disconnected from each other, and the particular second bearer that has been disconnected is discharged. Such discharge preferably occurs in a direction perpendicular to the first direction. In the event of there being a so-called "middle aisle", the delivery station can also be used for conveyance from/to the opposite bay. In that case the second bearers do not have to be disconnected. Such a discharge can be achieved by means of a separate conveyance vehicle.

According to another embodiment, it is possible to move each of the second bearers separately or to move only some second bearers simultaneously. In the simplest embodiment, it is possible to work with only one second bearer, which is provided by the robot with the appropriate plants or delivers the appropriate plants to said robot, and which is subsequently moved back to the receiving/delivery station. This single second bearer can be exchanged there for another second bearer, or the single second bearer can be filled or unloaded at said receiving/delivery station.

The invention also relates to a propagation system comprising a glasshouse with a first bearer at a first, low level for growing plants accommodated in containers on it, transfer means for moving said containers to a second, higher level, second bearers that are movable in a second direction, which second bearers are situated at that second level and are designed to receive plants from/deliver plants to said transfer means, said transfer means being active in a first direction that is perpendicular to the second direction of said second bearers in said glasshouse, and said second bearers being designed as storage/conveyance bearers, while said second bearers comprise a series of bench-like bearers standing against each other.

According to an advantageous embodiment, separate means of conveyance such as a vehicle are present to remove the second bearer at the end of the glasshouse. In other words, the robot described above can move only to and fro along the length of the glasshouse, while a separate vehicle is used for removal to a processing point.

According to an advantageous embodiment of the invention, the bench-like bearers are provided with means for keeping the containers upright, in other words for preventing them from falling over while they are being set down on the bench-like bearer or during its movement. This can be a serious problem, in particular in the case of pot plants.

According to an advantageous embodiment of the invention, these means can be composed of a number of pins projecting from the surface of the bench-like bearer, a number of which are pressed down in a simple manner when the pots are being placed. Adjacent pins remain projecting above the surface of the second bearer, so that the pot or other container is retained between the pins.

BRIEF DESCRIPTION OF THE DRAWINGS

The invention will be explained in greater detail below with reference to an exemplary embodiment illustrated in the drawing.

In the drawing.

DESCRIPTION OF THE PREFERRED EMBODIMENTS

Figure 1:
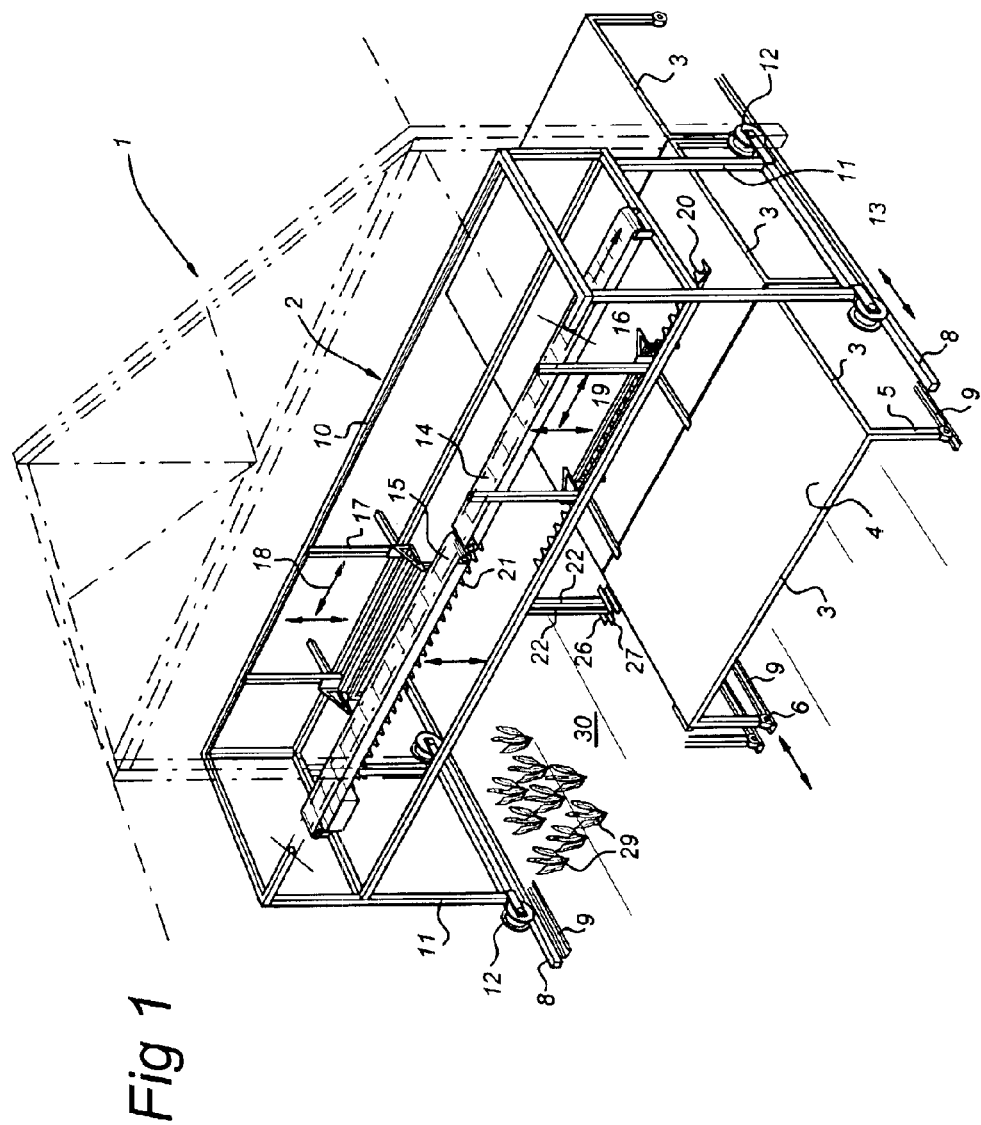
FIG. 1 shows diagrammatically an elevational view of a glasshouse construction provided with the robot and second bearers according to the invention.
Figure 2:
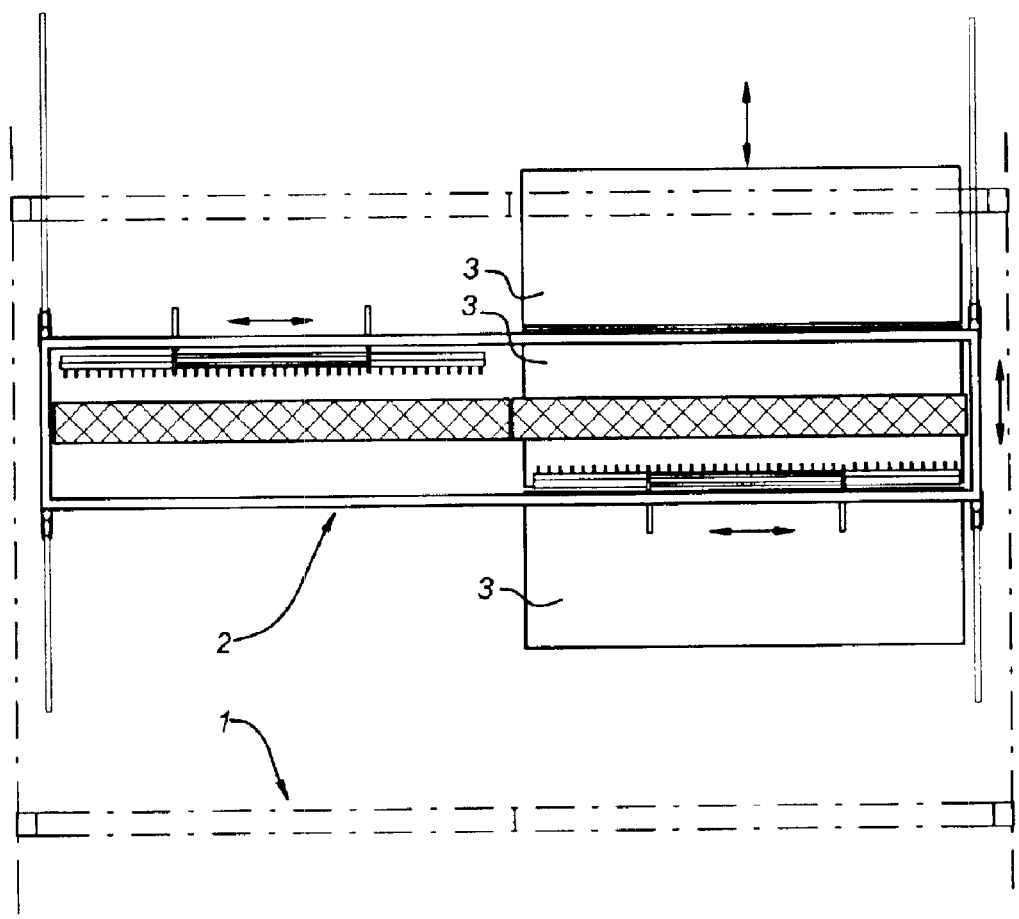
FIG. 2 shows diagrammatically a top view of a first arrangement of robot and mobile bench.

A glasshouse is indicated by 1 in FIG. 1. Only the frame is shown. It will be understood that the glasshouse construction can be of any design known in the prior art. A robot 2 and also a number of second bearers in the form of mobile benches 3 are provided inside it. Three mobile benches are shown in FIG. 1.

Each mobile bench 3 comprises a bearing surface 4 supported by legs 5, which run on wheels 6 guided in rails 9. The bearing surface 4 can be provided with means for ensuring stable positioning of the plants in containers such as pots and trays. The simplest design of said means is holes made in the bearing surface, for accommodation of the pots. Other retaining systems are conceivable, such as the division of the floor into individual segments that are sprung in the vertical direction. Segments in which containers are placed yield, while surrounding segments do not, with the result that lateral support can be provided. Robot 2 is provided with a frame 10 with legs 11, which near the ends are provided with wheels 12 guided in rails 8. Wheels 12 and wheels 6 may, if desired, move directly along the floor of a glasshouse. In all cases an encoding system will preferably be present, in order to permit in particular accurate determination of the position of the robot relative to the glasshouse. The robot 2, which is provided with a drive motor (not shown), can be supplied with power by means of a cable reel, the cable of which is connected to the mains supply. Autonomous drive by means of batteries and the like is also possible.

When the pots are being placed on the benches, only those pins 36 that form the "projection" of the pots will be pressed down. Adjacent pins will not be pressed down. This is shown diagrammatically in FIG. 5. It can be seen from this figure that pot 38 is surrounded by a number of pins 36 having shoulders 39 resting on bearing surface 34.

Robot 2 is provided with two clamping mechanisms 22, which extend vertically downwards. Each clamping mechanism has two jaws 26, 27, which lie at a distance from each other, and which are movable relative to each other for the purpose of clamping the bearing surface 4 of a corresponding mobile bench 3 between them. Accurate positioning of the corresponding mobile bench 3 relative to the robot during the transfer can be guaranteed in this way.

Figure 3:
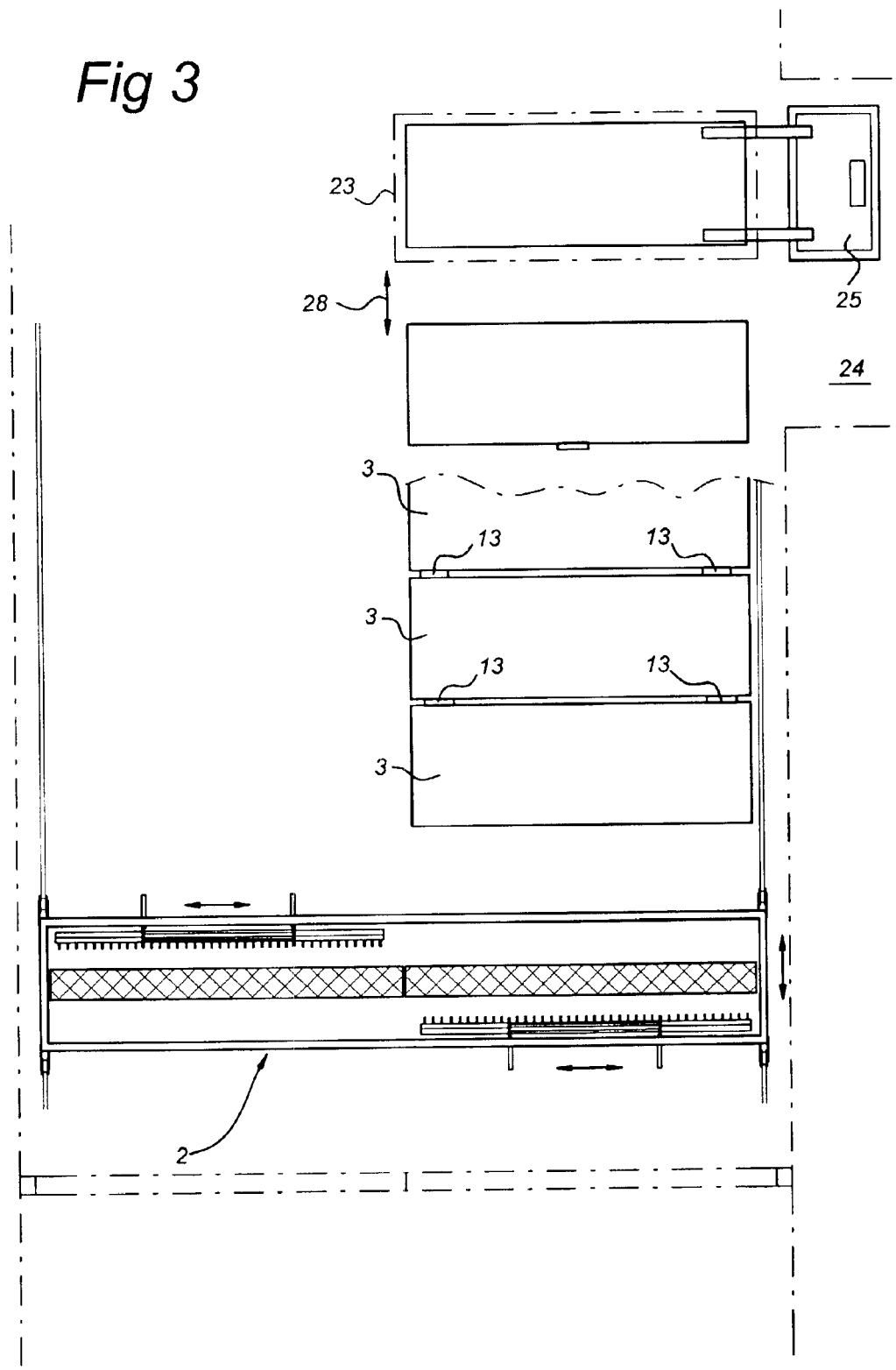
FIG. 3 shows diagrammatically a top view of a second arrangement of robot and mobile bench.
Figure 4:
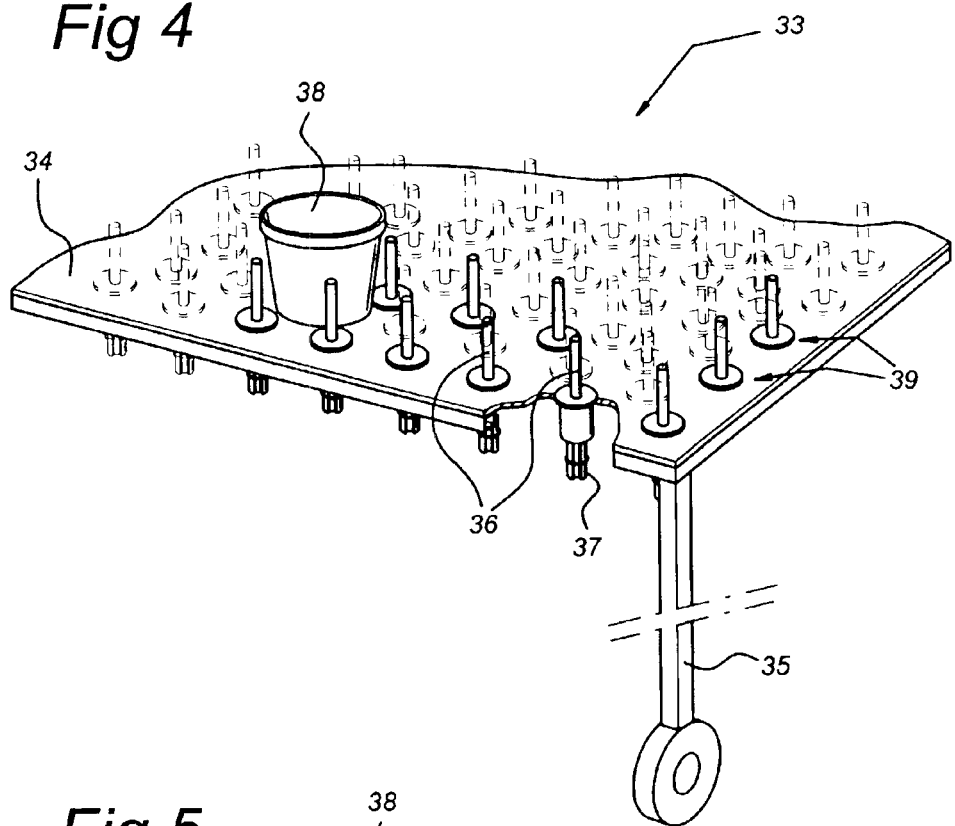
FIG. 4 shows diagrammatically a variant of the second bearer.

It can be seen in FIGS. 3 and 4 that a series of mobile benches 3 are interconnected by means of connections 13. The benches are movable in a first direction, in other words in the direction of arrow 28. A receiving/delivery station 23 for the mobile benches 3 is situated at the end of a glasshouse construction. It is possible, in a manner not illustrated in any further detail, by means of the receiving/delivery station to accommodate the last mobile bench 3 of a series in the station, to disconnect said bench from the adjacent mobile bench 3, and to deliver the bench in a direction that is preferably perpendicular to the first direction 28. The bench can subsequently be connected, in a manner not illustrated in any further detail, to a vehicle 25 and moved to an area indicated diagrammatically by 24 for further processing. This means that movement of the mobile benches 3 is achieved by the receiving/delivery station.

By moving the conveyors 16 and 17 and conveyors 14 and 15 of the robot, plants 29 can be picked up from the floor by means of forks 21, and can subsequently be placed by means of forks 21 and ultimately by way of forks 20 on bearer 4 of the mobile bench. Owing to the fact that belts 14 and 15 move at different speeds, it is possible to vary the distance between the plants. This is easily possible in particular in the case of plants that are standing stably on the conveyor belt. For plants that are not stable it is necessary to pick said plants up by gripping by means of the forks, and also to arrange for the conveyance along the belts to be carried out in accurately defined positions, for example with cassettes. The plants are also delivered in a tightly held position. It is also possible in the case of this construction to vary the distance between the plants. When the plants are being picked up, it is possible to pick up alternate plants, for example, and not all plants in a row. Subsequently setting down these plants again in the same position means that in this way the distance between them is increased twofold.

Conversely, it is likewise possible to move plants that are situated on the mobile bench 3 to the floor 30 of the glasshouse. Here again, the spacing can be varied, so that if the plants are standing close together on the mobile bench 3, they can be placed with greater spacing on the floor 30. By means of the construction according to the present invention, it is possible also to pick up plants in the case of which the containers have been placed against each other.

This contrasts with constructions according to the prior art that work with forks.

It can be seen from FIG. 3 that by movement of the robot two plants that are in any position relative to the mobile benches 3 in the glasshouse can be picked up from or set down on any desired mobile bench 3.

Of course, it is possible in the same way to install a series of mobile benches on the left side of the bay or glasshouse, so that in this way the part of the glasshouse on the right where the illustrated mobile benches are currently fitted can be provided with plants. It is also possible for the robots, starting from the position shown in FIGS. 1 and 3, always to move forwards or backwards, so that plants can be placed on the floor in this way.

The entire processing operation described above can be carried out fully automatically. In this way individual plants or individual series of plants can be taken out of a glasshouse and taken away. This is important, for example, if different colours of plants have been ordered. The mobile bench 3 is preferably designed in such a way that said bench can easily be accommodated in a lorry. In other words, by means of the robot 2 a specific order is carried out during the movement through the glasshouse on a specific mobile bench, and the mobile bench is subsequently placed in a lorry. All this can be performed at night or at any desired time, so that the plants reach their destination in as fresh a state as possible.

In addition, the presence of humans in glasshouses can be limited as much as possible. It is likewise possible, according to a further advantageous embodiment of the invention, to offer better guarantees that no contamination will occur in propagating houses. To that end, plants from a tissue culture situation, for example, are placed in the glasshouse and removed from the glasshouse only from that position. In other words, plants that are taken to the central processing area 24 are never returned to the propagating area, so that contamination can be prevented. To that end, it may be necessary to make the central processing area relatively large and to provide it with a buffer area for the temporary storage of (fully grown) plants. Such plants are less susceptible to diseases and the like, so that less high standards for the environment of the plant need be set at that point.

The mobile bench may be designed in any way that is conceivable in the prior art. If transport over fairly large distances is envisaged, it is preferable for said mobile bench to be designed in such a way that the plants assume a stable position. If the benches are being used for transport in lorries, for example, it is preferable for them to be of a collapsible design, so that they take up little space on the return journey.

In fact, the mobile bench according to the invention serves as a means of conveyance, and not as a bearer during the propagation.

It has been found that when it is used in combination with pot plants, it is possible to handle upwards of about 4,000 pots per hour without great problems. This means that an increase in efficiency can be obtained and, as is clear from the above, the full floor surface of the glasshouse (apart from the space for the rails) can be used for propagation. In principle, it is no longer necessary for people to be present in the glasshouse, since the plants in question are placed in the glasshouse and removed from it again and/or spaced more widely in the glasshouse by automated means.

Figure 5:
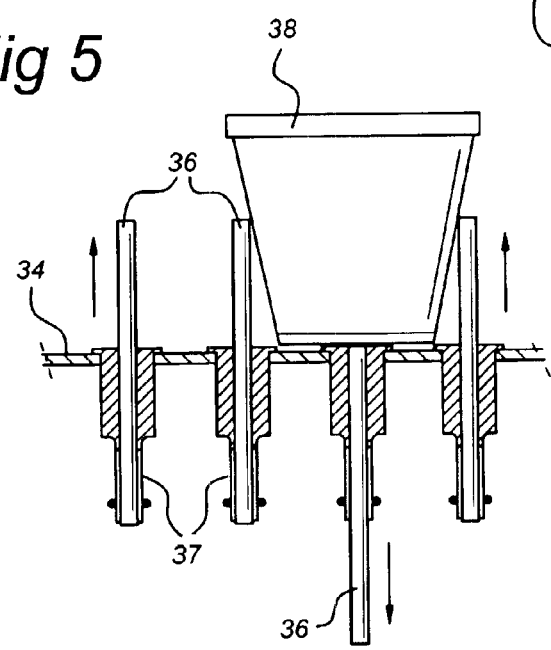
FIG. 5 shows a detail of FIG. 4.

A variant of the mobile benches is indicated in its entirety by 33 in FIGS. 4 and 5. A bench surface 34 is present, connected to legs 35 designed to run in rails (not shown).

The bearing surface 34 is provided with a large number of apertures, through which pins 36 project upwards. Said pins 36 are accommodated in diagrammatically indicated guides 37. The pins 36 are accommodated in a light press fit in guides 37. For an advantageous embodiment the guides 37 are provided with grooves, and a compressive force is exerted upon the grooves by means of an O-ring, which force is counteracted at the other side by the pins 36.

When the pots are being placed on the benches, only those pins 36 that form the "projection" of the pots will be pressed down. Adjacent pins will not be pressed down. This is shown diagrammatically in FIG. 5. It can be seen from this figure that pot 38 is surrounded by a number of pins 36.

After some sort of treatment and removal of the pots 38, all pins 36 can be restored to the projecting initial position. Tilting of the pots 38 during conveyance and other movement can be prevented in this way.

It will be understood that, on the basis of the ideas described above, many variants that will immediately spring to mind in the case of the person skilled in the art are possible and lie within the scope of the appended claims. For instance, it is possible in the manner described above to work with only a single mobile bench or several mobile benches, which bench(es) is (are) moved over the entire distance in the glasshouse or over a part thereof for each loading/unloading operation.

What is claimed is:

1. Method for growing first plants on a first bearer provided at a first, low level in a glasshouse, comprising the steps of:

moving said first plants from said first bearer by a means of conveyance, over second plants at the first, low level, to a second bearer, wherein a number of second bearers disposed in a row are present; and temporarily horizontally moving the second bearer with the first plants over said second plants, such that the second plants are underneath the second bearer and go into shade for a short time, wherein movement of the second bearer causing movement of at least one other of said second bearers so that the second plants at the first low level are not in shade, and each second bearer is capable of containing a large number of plants placed next to each other in two horizontal directions.

2. Method according to claim 1, wherein a number of first plants are moved simultaneously from said first to said second bearer, or vice versa.

3. Method according to claim 2, wherein the distance between said first plants is altered during the movement.

4. Method according to claim 1, wherein said second bearer is moved in a first direction in said glasshouse and at a fixed point in said glasshouse is moved in a second direction that is substantially perpendicular to said first horizontal direction.

5. Method according to claim 4, wherein a number of second bearers are moved simultaneously in the first horizontal direction.

6. Method according to claim 1, wherein said second bearer comprises a bench-like construction.

7. Propagation system comprising:

a glasshouse with a first bearer at a first, low level for growing plants accommodated in containers on it, transfer means (2) for moving said containers to second, higher level, second bearers that are movable in a horizontal direction over said first low level, which second bearers are situated at that second level arranged to temporarily move over said first level and are designed to receive plants from/deliver plants to said transfer means, said transfer means being active in a first vertical direction that is perpendicular to the horizontal direction of said second bearers in said glasshouse, and said second bearers being designed as storage/conveyance bearers, wherein said second bearers comprise a series of bench bearers standing against each other, the first plants being exposed to light when on the second bearer positioned over the second plants and the second plants being free of any shade.

8. Propagation system according to claim 7, wherein said transfer means comprise a robot that is movable in said first vertical direction.

9. Propagation system according to claim 8, wherein said robot comprises a conveyor assembly for plants that extends transversely to its direction of movement.

10. Propagation system according to claim 9, wherein said conveyor system is designed for altering the distance between adjacent plants.

11. Propagation system according to claim 7, further comprising a receiving/delivery station (23) for said second bearers, which receiving/delivery station is designed to receive said second bearers in the first vertical direction and to deliver them in the horizontal direction, or vice versa.

12. Propagation system according to claim 7, further comprising a vehicle (25) for moving said second bearers.

13. Propagation system according to claim 7, further comprising retaining means for said containers on said bench bearers.

* * * * *